United States Patent
Lee

(10) Patent No.: US 7,725,137 B2
(45) Date of Patent: May 25, 2010

(54) BATTERY DEVICE IN A MOBILE TERMINAL AND OPERATING METHOD THEREOF

(75) Inventor: Kwon-Yee Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1094 days.

(21) Appl. No.: 11/271,696

(22) Filed: Nov. 10, 2005

(65) Prior Publication Data

US 2006/0121956 A1 Jun. 8, 2006

(30) Foreign Application Priority Data

Nov. 11, 2004 (KR) .................. 10-2004-0091721

(51) Int. Cl.
*H04M 1/00* (2006.01)
(52) U.S. Cl. ................. 455/572; 455/575.1; 455/343.1; 455/575.2
(58) Field of Classification Search ...... 455/572–575.1, 455/343.1–343.5
See application file for complete search history.

(56) References Cited

U.S. PATENT DOCUMENTS

| | | | |
|---|---|---|---|
| 5,230,016 A * | 7/1993 | Yasuda .................... 455/575.1 |
| 5,747,187 A * | 5/1998 | Byon .......................... 429/58 |
| 5,963,019 A | 10/1999 | Cheon |
| 6,342,826 B1 * | 1/2002 | Quinn et al. ................. 337/300 |
| 6,380,710 B1 * | 4/2002 | Watanabe et al. ........... 320/101 |
| 6,405,062 B1 * | 6/2002 | Izaki .......................... 455/573 |
| 6,462,515 B1 | 10/2002 | Hanafusa et al. |
| 6,570,749 B1 * | 5/2003 | Ling et al. ................... 361/102 |
| 7,206,567 B2 * | 4/2007 | Jin et al. .................. 455/404.1 |
| 2005/0003266 A1 * | 1/2005 | Wulff .......................... 429/97 |
| 2009/0124299 A1 * | 5/2009 | Suzuki et al. ............... 455/573 |

* cited by examiner

*Primary Examiner*—Lana N Le
(74) *Attorney, Agent, or Firm*—The Farrell Law Firm, LLP

(57) ABSTRACT

Disclosed herein are a battery device for preventing danger caused by battery overheating in a mobile terminal, and a method of operating the battery device. In the battery device, a battery state sensor periodically monitors a change in the state of a battery during operation or charging of the battery, and outputs a predetermined signal corresponding to the monitored state change, a controller senses a battery overheating-caused danger from the signal received from the battery state sensor and outputs a control signal, and an automatic locker separates the battery from the mobile terminal according to the control signal received from the controller.

9 Claims, 6 Drawing Sheets

BATTERY DEVICE IN A MOBILE TERMINAL AND OPERATING METHOD THEREOF

PRIORITY

This application claims priority under 35 U.S.C. §119 to an application entitled "Battery Device in a Mobile Terminal and Operating Method thereof" filed in the Korean Intellectual Property Office on Nov. 11, 2004 and assigned Serial No. 2004-91721, the contents of which are incorporated herein by reference.

BACKGROUND OF THE INVENTION

1. Field of the Invention

The present invention relates generally to a battery device in a mobile terminal and an operating method thereof, and in particular, to a battery device for use in a mobile terminal, for automatically detaching a battery from the mobile terminal to prevent an accident caused by battery overheating, and a method of operating the battery device.

2. Description of the Related Art

Mobile terminals for providing mobile communication services, such as CDMA (Code Division Multiple Access), GSM (Global System for Mobile communication), PCS (Personal Communications Service), and PDA (Personal Digital Assistant) phones, are provided with detachable batteries for supplying standby power or operational power. The detachable batteries allow users to carry the mobile terminals conveniently and use them at any place. A mobile terminal is typically provided with such a battery on one side thereof, for power supply, and the battery will have a different size according to its capacity.

The mobile terminal needs DC (Direct Current) power to operate. The DC power is externally provided to the mobile terminal and, at the same time, it is converted to a predetermined current through a predetermined control and charges the battery. The battery is a typically rechargeable, generally of a NiCd (Nickel-Cadmium), NiMH (Nickel-Metal-Hydride) or Li Ion (Lithium-Ion) type.

Mobile terminals have much circuitry, often include many devices, and emit much heat during a call. A NiCD or Li Ion battery is usually used for the mobile terminal. If a call lasting a long time is made through the mobile terminal, the battery will heat up and, in turn, will heat the mobile terminal. This heat from the battery, along with the heat generated inside the terminal, can cause malfunction or communication failure and, at worst, a battery explosion.

When an abnormal condition such as an overcurrent condition overheats the battery, the overheating may occur while the battery is installed in the mobile terminal, which includes a risk of the battery exploding.

Since the battery should be portable and easily carried in view of the nature of its use, batteries for mobile terminals are typically made as thin and lightweight as possible. As a result, there is a probability that the battery may be damaged or even may explode due to heat from the chemical reaction among electrolytes or due to external shock-incurred mixing of the electrolytes during charging/discharging of the battery. Hence, there is a need for a system that senses a change in temperature inside the battery and ensures the safety of the battery by providing a control signal that corresponds with the temperature change.

SUMMARY OF THE INVENTION

An object of the present invention is to substantially solve at least the above problems and/or disadvantages and to provide at least the advantages below. Accordingly, an object of the present invention is to provide a battery device in a mobile terminal for automatically separating a battery from the mobile terminal to avoid danger caused by battery overheating, and a method of operating the battery device.

The above object is achieved by providing a battery device for preventing danger caused by battery overheating in a mobile terminal, and a method of operating the battery device. In the battery device, a battery state sensor periodically monitors a change in the state of a battery during operation or charging of the battery and outputs a predetermined signal corresponding to the monitored state change, a controller senses a battery overheating-caused danger from the signal received from the battery state sensor and outputs a control signal, and an automatic locker separates the battery from the mobile terminal according to the control signal received from the controller.

In the battery device operating method, temperature of a battery is periodically monitored. It is determined whether the mobile terminal is in a battery overheating-caused danger state according to the monitored temperature. If the mobile terminal is in the battery overheating-caused danger state, the battery is released from a locked state and separated from the mobile terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein with reference to the accompanying drawings. In the following description, well-known functions or constructions are not described in detail to avoid obscuring the invention with unnecessary detail.

The present invention is intended to provide a method of preventing danger from battery overheating by automatically detaching the battery from a mobile terminal. A spring function may be added to a button that fixes the battery and, a software modification may be made to block power supply from the battery to the components of the mobile terminal, controlling the button. Hence, when the danger entailed by battery overheating is sensed, the battery is easily detached from the mobile terminal.

Figure 1:
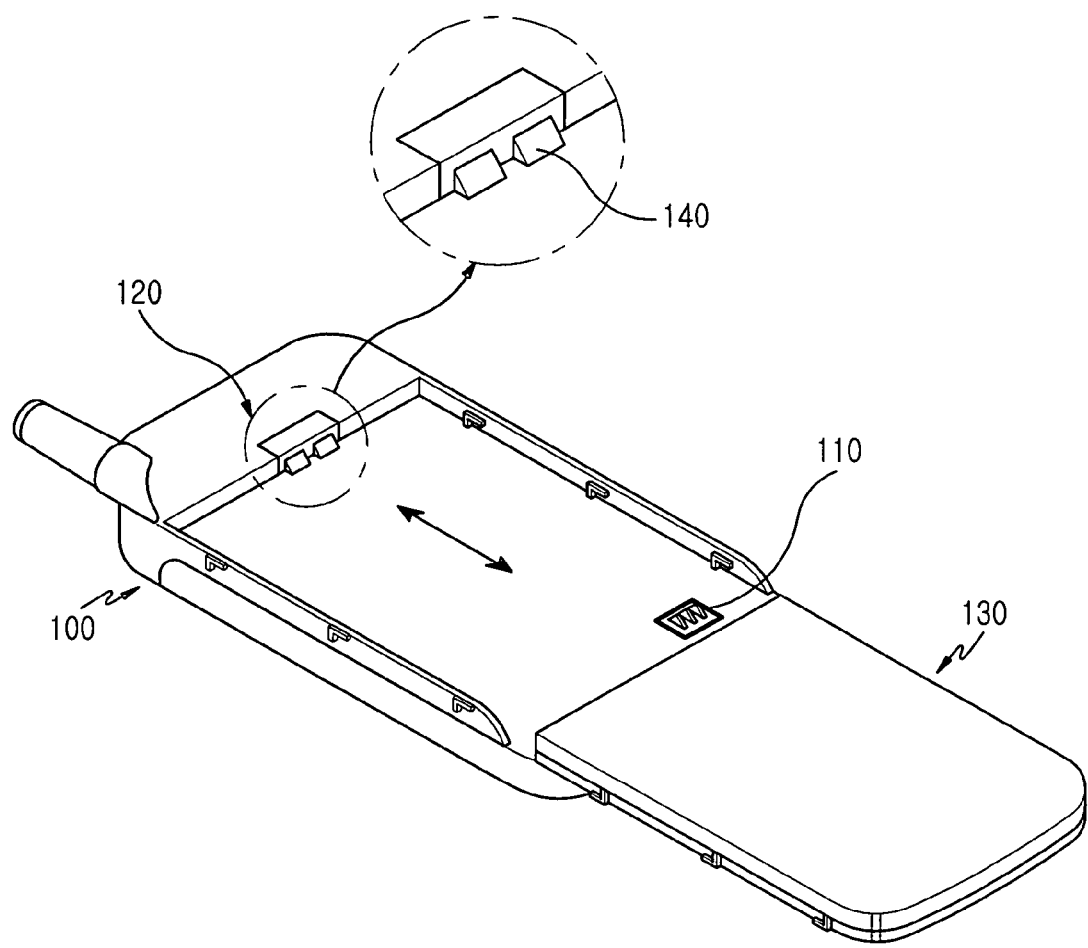
FIG. 1 is a perspective view of a mobile terminal from which a battery is detached according to an embodiment of the present invention.

A description will be made of the battery attachable/detachable to/from the mobile terminal with reference to FIG. 1. FIG. 1 is a perspective view of the mobile terminal from which the battery is detached according to an embodiment of the present invention.

Referring to FIG. 1, the mobile terminal includes a main body 100, an automatic locker 120 formed on a portion of the main body 100, and a battery 130 detachably fixed on the main body 100 by the automatic locker 120. According to the present invention, the battery 130 is preferably separated from the main body 100 in a sliding manner. Although the main body 100 may be further provided with an engagement groove in addition to the automatic locker 120, the engagement groove is not provided the present embodiment to allow the battery 130 to automatically slide along the main body 100.

Battery 130 includes a battery cell mounted inside a battery case having a front case and a rear case. A front connector is provided on the battery cell on a lower portion of the front case that is brought into contact with the main body 100. A rear connector is formed on a lower portion of the rear case opposite to the front case, for charging the battery cell in contact with a charger terminal (not shown). The battery 130 is further provided with a fixing groove formed in an upper portion of the rear case. To receive power from the battery 130, the main body 100 has a connector 110 to contact the front connector of the battery 130.

In the thus-configured mobile terminal, the battery 130 is attached onto the main body 100 by means of the automatic locker 120 formed on a portion of the main body 100.

The automatic locker 120 fixes the battery 130 on the mobile terminal. According to the present embodiment of the invention, the automatic locker 120 may further include a motor driven by a predetermined control signal so as to automatically push the battery 130 off the mobile terminal, upon sensing battery overheating. For the purpose, the automatic locker 120 has a locker portion 140 to release the battery 130 from a locked state by the control signal. The locker portion 140 makes the battery slightly bounce by spring action and be slidingly detached from the mobile terminal.

Figure 2:
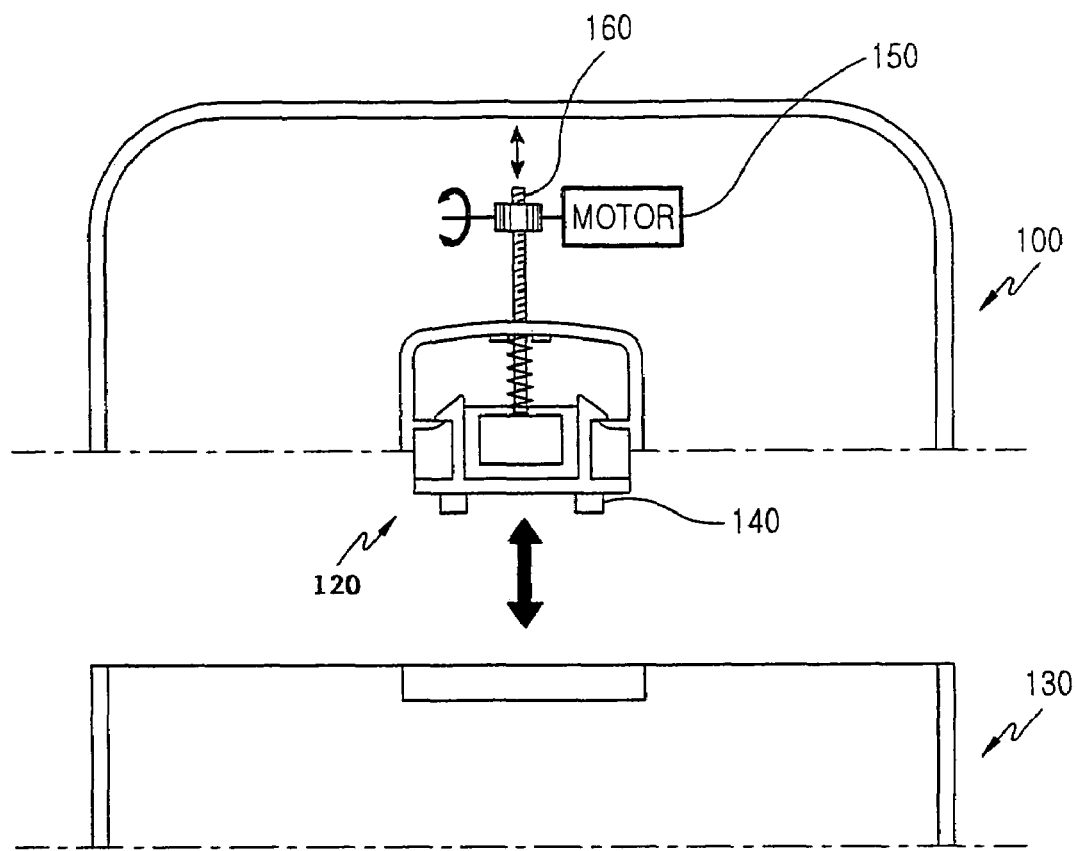
FIG. 2 is a sectional view of an automatic locker illustrated in FIG. 1.

The operation of the automatic locker 120 will be described in more detail with reference to FIG. 2. FIG. 2 is a sectional view of the automatic locker 120. Referring to FIG. 2, the automatic locker 120 includes the locker portion 140, a driving motor 150, and a gear portion 160. The locker portion 140 is formed at a predetermined position of the main body 100, for automatically releasing the battery 130 from a locked state with the main body 100 by motor rotation. The gear portion 160 is connected to the locker portion 140, for converting the rotational movement of the motor to a linear movement. The driving motor 150 rotates in conjunction with the gear portion 160 and is driven by the control signal generated upon sensing battery overheating.

Automatic separation of the battery 130 from the main body 100 will be described in detail below. While a user fixes the battery 130 onto the main body 100 by the fixing button of the main body 100 for battery installation, the automatic locker 120, which functions as a spring, slightly bounces the battery 130 off the mobile terminal by the control signal when a battery overheating-caused danger is sensed.

The temperature of the battery 130 is continuously monitored during the operation of the mobile terminal. If the temperature is equal to or higher than a predetermined threshold, a driving signal is fed to the driving motor 150, to thereby rotate the driving motor 150. Thus, the gear portion 160 in engagement with the driving motor 150 is operated. The gear portion 160 is interlocked with the locker portion 140 to release the battery 130 from the locked state.

Figures 3A, 3B, 3C:
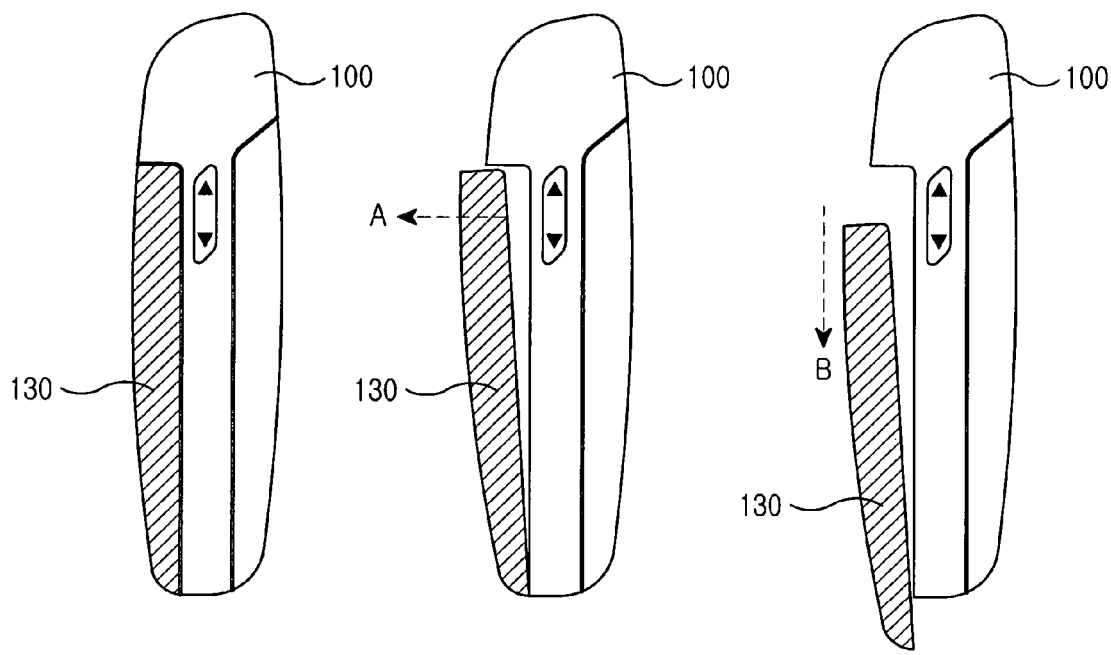
FIGS. 3A, 3B and 3C are perspective views sequentially illustrating detachment of the battery according to the embodiment of the present invention.

The sequential process of detaching the battery 130 according to the embodiment of the present invention will be described with reference to FIGS. 3A, 3B and 3C. FIGS. 3A, 3B and 3C are perspective views sequentially illustrating detachment of the battery. 130 according to the embodiment of the present invention. The battery 130 is attached to the main body 100, as shown in a side view of the mobile terminal in FIG. 3A. When the locker portion 140 operates, the battery 130 springs up slightly in the direction of A in FIG. 3B. As the battery 130 is released from its locked state by the locker portion 140, it slides along the main body 100 to be separated, as shown in FIG. 3C.

In this way, the automatic locker 120 is so configured as to instantaneously bounce the battery 130 off the mobile terminal in order to avoid such a danger as explosion caused by battery overheating. While the automatic locker 120 has been described to have the configuration illustrated in FIG. 2, it is not limited to the configuration. Thus, the automatic locker 120 can be configured in any other way as far as it can function as a spring to easily separate the battery 130 from the mobile terminal.

To avoid battery overheating-caused dangers, the battery device operates as follows.

During the operation of the mobile terminal or charging the battery 130, electrolytes in the battery cell may chemically react, emitting much heat. Exposing the battery 130 to too much shock may mix the electrolytes, resulting in generation of too much heat. The resulting danger such as explosion is prevented by sensing the overheating and quickly and automatically separating the battery 130 from the mobile terminal.

While the battery explosion is avoided by sensing the battery temperature in the embodiment of the present invention, in another embodiment of the present invention, current flowing into the main body 100 as well as the battery temperature is sensed to thereby avoid the danger. Both chemical reaction and overcurrent caused by inadvertent shortcircuit lead to an increase in the temperature. That is, the temperature gradually increases in the process of chemical reaction and if the temperature reaches a certain value, the battery 130 may explode. Overcurrent often entails undervoltage, which naturally increases the temperature.

Figure 4:
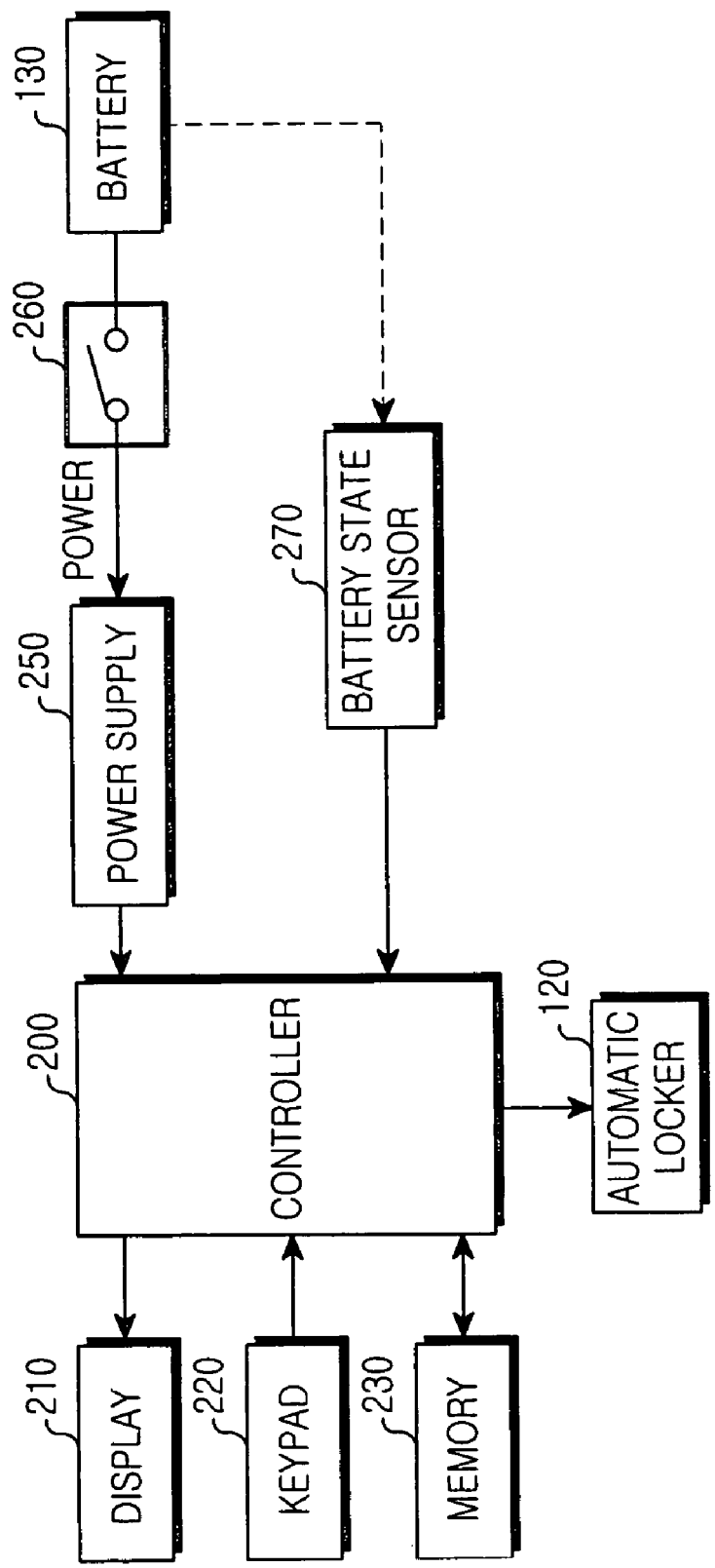
FIG. 4 is a block diagram of the mobile terminal for automatically detaching the battery according to the embodiment of the present invention.

To better understand the above-described battery separation method, the structure and operation of the mobile terminal will be described with reference to FIG. 4. FIG. 4 is a block diagram of the mobile terminal for automatically detaching the battery according to the embodiment of the present invention.

Referring to FIG. 4, a controller 200 receives a predetermined power, processes wireless calls and data in the mobile terminal, and controls each component. That is, the controller 200 provides overall control to the mobile terminal. The predetermined power refers to power from a power supply 250. According to the present invention, aside from controlling operation for a calling function, the controller 200 monitors the state of the battery 130 and determines whether the battery 130 is overheated. If it is, the controller 200 controls the automatic locker 120 to automatically separate the battery 130 to avoid battery explosion.

Specifically, the controller 200 monitors the battery state, for example, the temperature inside the battery 130 at every predetermined time period, in the same manner as voltage monitoring, and determines whether the temperature is equal to or higher than an overheating threshold indicating a danger such as explosion.

If sensing the danger, the controller 200 controls a switch 260 to block power from the battery 130 and to disconnect the battery 130 from the mobile terminal. Alternatively, the controller 200 controls the automatic locker 120 to slightly bounce the battery 130 off the mobile terminal. That is, the controller 200 analyzes a signal received from a battery state sensor 270 that monitors the battery temperature, senses battery overheating, and outputs a corresponding control signal.

A display 210 displays screen data corresponding to key input data received from a keypad 220, or displays the operational state of the mobile terminal and other information in icons or characters under the control of the controller 200. When the user sets or invokes a desired function, the display 210 also visually notifies of the function setting or invocation under the control of the controller 200. Especially, the display 210 can display a message notifying the user of danger that might be caused by battery overheating under the control of the controller 200.

The keypad 220 includes alphanumerical keys and function keys and provides key input data received form the user to the controller 200. That is, the keypad 220 outputs key input data corresponding to keys pressed by the user to the controller 200. The controller 200 determines key inputs from which the key input data have been generated and performs corresponding operations.

A memory 230 connected to the controller 200 preferably includes a ROM (Read Only Memory) for storing programs and information necessary to control the operation of the mobile terminal, a RAM (Random Access Memory), and a voice memory. The memory 230 also stores the overheating threshold as a criterion by which to determine battery overheating under the control of the controller 200.

The battery 130 includes battery cells for converting between electric and chemical energy, accumulates chemical energy during charging, converts chemical energy to electric energy and provides the electric energy to the power supply 250 during discharging.

The power supply 250 provides power needed for to operate each component of the mobile terminal from the battery 130. Upon receipt of a battery overheating sensing signal from the battery state sensor 270, the controller 200 outputs a control signal for controlling power to each component to the automatic locker 120, so that the battery 130 is automatically separated from the mobile terminal. The controller 200 may transmit a control signal directly to the switch 260 according to the output of the battery state sensor 270 so that the switch 260 allows power supply from the power supply 250 to components or blocks the power supply.

The switch 260 may be implemented in software, for example, by control of a transistor, and functions to shortcircuit the battery 130 from the main body of the mobile terminal by blocking power supply. The switch may be implemented as the automatic locker 120 so as to slightly bounce the battery 130 off and thus separate the battery 130 from the main body of the mobile terminal.

The battery state sensor 270 periodically monitors the temperature change of the battery and outputs a monitored temperature change by a predetermined signal. To sense the temperature change of the battery 130, a thermistor can be used. Using the thermistor, the battery state sensor 270 senses the temperature change of the battery 130 as the battery 130 is used or charged, and outputs a corresponding signal to the controller 200. If the battery temperature increases, the battery state sensor 270 reads the increased temperature and outputs to the controller 200 a signal indicating whether the battery temperature is equal to or higher than the overheating threshold in order to avoid battery overheating-caused danger.

Hence, the controller 200 senses battery overheating by analyzing the signal received from the battery state sensor 270 and outputs a corresponding control signal to the switch 260 so that the switch 260 switches off power from the battery 130. Also, the controller 200 can control the automatic locker 120 to automatically separate the battery 130 from the mobile terminal.

Figure 5:
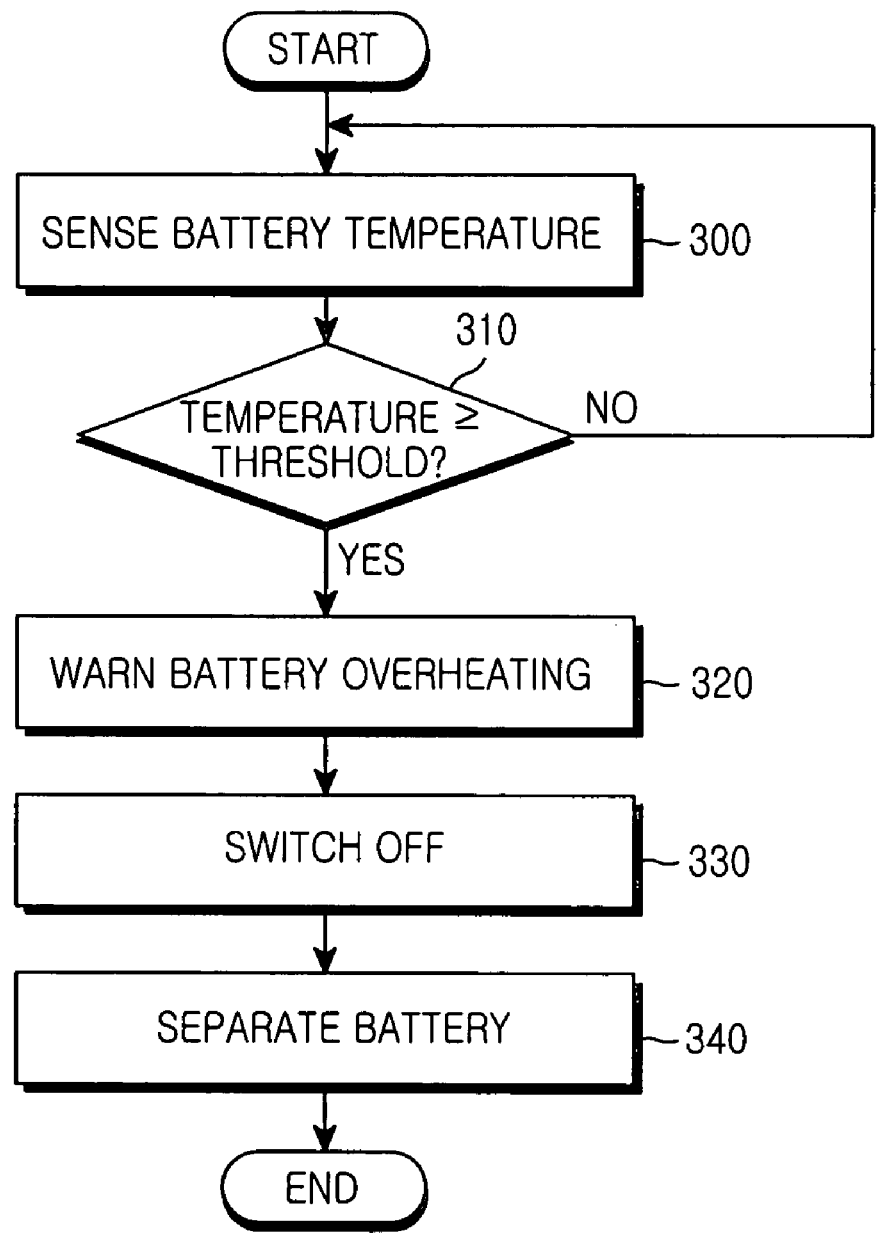
FIG. 5 is a flowchart illustrating a control operation for preventing battery overheating in the mobile terminal according to the embodiment of the present invention.

Now, the battery state sensing and automatic separation of the battery will be described in more detail with reference to FIG. 5. FIG. 5 is a flowchart illustrating a control operation for preventing battery overheating in the mobile terminal according to the embodiment of the present invention. Referring to FIG. 5, the controller 200 detects the temperature of the battery 130 by controlling the battery state sensor 270 to periodically monitor the battery temperature in step 300. In step 310, the controller 200 compares the detected battery temperature with the overheating threshold at which the battery 130 might explode due to overheating.

If the battery temperature is lower than the overheating threshold, the controller 200 returns to step 300, considering that the battery temperature is normal. On the other hand, if the battery temperature is equal to or higher than the overheating threshold, the controller 200 displays a message warning of a danger due to the battery overheating on the display 210, or sounds an alarm in step 320.

In step 330, the controller 200 turns off the switch 260 and thus disconnects the battery 130 from the power supply 250, thereby disconnecting the battery 130 from the mobile terminal. The controller 200 controls the automatic locker 120 to release the battery 130 from a locked state and the battery 130 slidingly separates from the mobile terminal in step 340.

The battery state sensing and automatic separation of the battery according to another embodiment of the present invention will be described with reference to FIG. 6.

Figure 6:
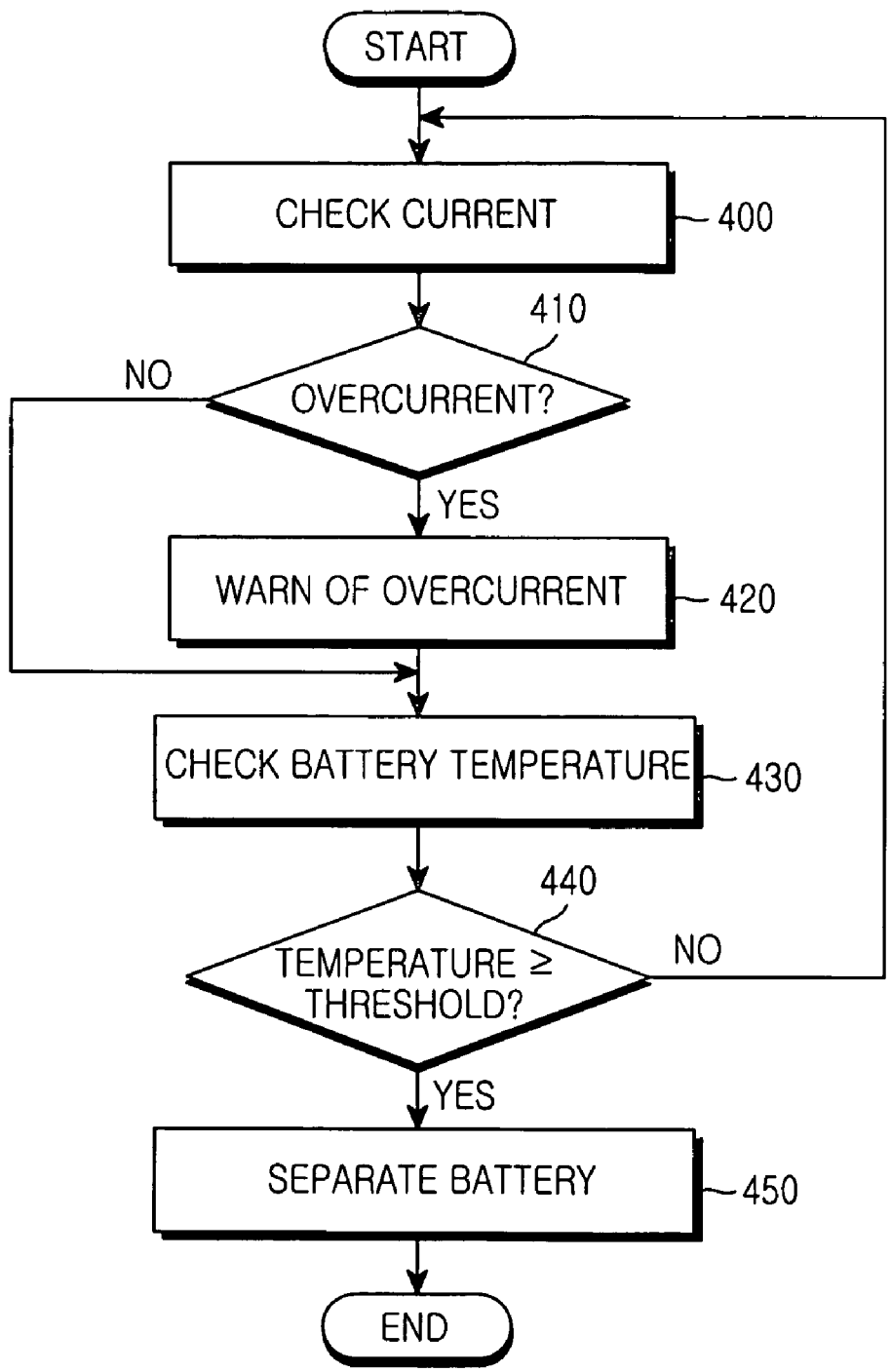
FIG. 6 is a flowchart illustrating a control operation for preventing battery overheating in the mobile terminal according to another embodiment of the present invention.

FIG. 6 is a flowchart illustrating a control operation for preventing battery overheating in the mobile terminal according to another embodiment of the present invention. Referring to FIG. 6, upon power-on, the controller 200 detects the state of the battery 130 through the battery state sensor 270. The controller 200 receives a signal indicating the value of a current flowing from the battery 130 in step 400 and compares the current with a predetermined threshold in step 410. If the current is equal to or higher than the threshold, the controller 200 warns the user that the battery 130 is in an overcurrent state that might cause a dangerous situation like battery explosion in step 420. It can be further contemplated as a third embodiment of the present invention that the controller 200 controls the switch 260 to block the current flowing from the battery 130 according to the number of overcurrent inflows. Meanwhile, in the second embodiment of the present invention, the battery temperature is monitored along with the overcurrent monitoring. Thus, the controller 200 checks the temperature of the battery 130 in step 430 and compares the battery temperature with the overheating threshold in step 440. If the battery temperature is equal to or higher than the overheating threshold, the controller 200 controls the automatic locker 120 to separate the battery 130 from the mobile terminal in step 450.

As described above, the battery 130 is forcedly disconnected from the mobile terminal through the switch 260 according to the number of overcurrent inflows. At the same time, in a battery overheating situation, the battery 130 is released from a locked state and separated from the mobile terminal.

In the above-described embodiments of the present invention, upon sensing a dangerous situation caused by battery overheating, the switch is turned off, thereby disconnecting the battery from the mobile terminal. At the same time, the automatic locker is controlled to push the battery off the mobile terminal.

An advantage with the present invention is that battery overheating is determined through periodic monitoring of battery temperature and thus, upon sensing battery overheating, a battery is automatically separated from a mobile terminal, thereby avoiding battery overheating-caused accidents. Another advantage is that the use of a thermistor for preventing the battery overheating from damaging the battery and mobile terminal circuitry during charging or using the battery reduces product cost.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A battery device for preventing a danger caused by overheating of a battery detachably fixed in a mobile terminal, comprising:
    a battery state sensor for periodically monitoring a temperature of the battery during operation or charging of the battery; and
        an automatic locker for separating the battery from the mobile terminal by releasing the battery from a locked state when the monitored temperature is equal to or higher than a temperature threshold,
    wherein the automatic locker comprises:
    a locker portion formed at a predetermined position of the mobile terminal, for automatically releasing the battery from the locked state as a driving motor rotates and separating the battery from the mobile terminal;
    a gear portion connected to the locker portion, for converting the rotation of the driving motor to a linear movement; and
    the driving motor for rotating in engagement with the gear portion.

2. The battery device of claim 1, wherein the driving motor is rotated by a controller.

3. The battery device of claim 1, wherein a controller compares the temperature of the battery detected by the battery state sensor with an overheating threshold indicating a battery overheating-caused danger state and outputs a control signal corresponding to the comparison result.

4. The battery device of claim 1, wherein the battery state sensor senses a current flowing through a main body of the mobile terminal.

5. The battery device of claim 1, wherein the battery state sensor senses a change in battery temperature.

6. The battery device of claim 5, wherein the battery state sensor comprises a thermistor for sensing the change in battery temperature.

7. The battery device of claim 1, wherein the battery state sensor senses whether the battery is overheated and transmits a predetermined signal to a controller when the monitored temperature is equal to or higher than the temperature threshold, so that the battery is disconnected from the mobile terminal under the control of the controller.

8. The battery device of claim 1, wherein a controller determines that the battery is overheated when the monitored temperature is equal to or higher than an overheating threshold or current flowing from the battery sensed by the battery state sensor is equal to or higher than a predetermined current threshold.

9. The battery device of claim 1, further comprising:
    a display for displaying a message warning danger;
    a power supply for providing power to each component of the mobile terminal from the battery; and
    a switch for blocking power to said each component according to a control signal received from a controller.

* * * * *